(12) United States Patent
Brunner et al.

(10) Patent No.: US 6,567,462 B1
(45) Date of Patent: May 20, 2003

(54) RECEIVER AND METHOD OF RECOVERING DATA FROM RADIO SIGNALS

(75) Inventors: Christopher Brunner, München (DE); Martin Haardt, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/360,486

(22) Filed: Jul. 23, 1999

(30) Foreign Application Priority Data

Jul. 23, 1998 (EP) .............................. 98113839

(51) Int. Cl.$^7$ ............................. H04B 1/69

(52) U.S. Cl. ................. 375/148; 375/150; 375/347

(58) Field of Search ............................. 375/130, 147, 375/347, 148, 150; 370/342, 335; 455/132

(56) References Cited

U.S. PATENT DOCUMENTS 6,304,750 B1 * 10/2001 Rashid-Farrokhi et al. . 375/148

FOREIGN PATENT DOCUMENTS

| EP | 0661831 A2 | 7/1995 |
| EP | 0825727 A1 | 2/1998 |

OTHER PUBLICATIONS

"Blind Adaptive 2D RAKE Receiver for DS–CDMA Based on Space–Frequency MVDR Processing", Michael D. Zoltowski et al., IEEE Transactions on Signal Processing, Jun. 1996, pp. 1–29.

"Blind 2–D Rake Receivers Based on Space–Time Adaptive MVDR Processing for IS–95 CDMA System", Michael D. Zoltowski et al., IEEE, 1996, pp. 618–622.

"Adaptive Blind 2D Rake Receiver for Multiuser Detection", Jaeyoung Kwak et al., IEEE 1998, pp. 313–317.

* cited by examiner

Primary Examiner—Temesghen Ghebretinsae
(74) Attorney, Agent, or Firm—Laurence A. Greenberg; Werner H. Stemer; Ralph E. Locher (57) ABSTRACT

A receiver that operates to recover data from spread spectrum radio signals, which include radio signals generated from a combination of the data and a data spreading code associated with the user and radio signals generated from a combination of a predetermined sequence of pilot data and a pilot spreading code. The receiver includes a plurality of antennas, each arranged to detect a different version of the radio signals. Base band conversion means is coupled to the plurality of antennas and arranged to generate, for each antenna, base band signal samples representative of the version of the radio signals. Data recovery means operates to correlate each version of the signal samples with respect to the pilot spreading code, form at least one covariance matrix from a frequency domain representation of a predetermined temporal window of the correlated pilot signals samples, correlate each version of the signal samples with respect to the user data spreading code, form a frequency domain representation of each version of the data correlated signal samples, and detect the data from the frequency domain data correlated signal samples in combination with the at least one covariance matrix. A method used with the receiver is also provided.

18 Claims, 5 Drawing Sheets

FIG 5

RECEIVER AND METHOD OF RECOVERING DATA FROM RADIO SIGNALS

BACKGROUND OF THE INVENTION

Field of the Invention

The present invention relates to radio communications apparatus and methods of communicating data using radio signals. More specifically, the present invention relates to receivers that recover data for at least one of a plurality of users from spread spectrum radio signals. Furthermore, the present invention relates to a method of recovering data for at least one of a plurality of users from spread spectrum radio signals.

Data is communicated using code division multiple access systems (CDMA) by combining the data with a user specific spreading code and transmitting the combination to a receiver using radio signals. At the receiver, the data is recovered from the radio signals by comparing the received sampled radio signals with a user specific spreading code that is known to the receiver. Similarly, a plurality of transmitters operatively coupled to a corresponding plurality of user data sources can be configured to contemporaneously communicate data from the transmitters to the receivers which detect the data by comparing the radio signals with the user specific spreading code uniquely associated with each of the users.

A result of combining the data with a user specific spreading code is that the bandwidth obtained from the resulting radio signals is greater than that obtained by radio signals carrying data alone. Accordingly, the frequency bandwidth occupied by code division multiple access signals is often greater than a coherence bandwidth of the radio communications channel through which the signals are transmitted. Code division multiple access communicated radio signals provide an advantage because the signals themselves exhibit frequency diversity, and different parts of the bandwidth of the radio signals suffer from fading independently.

Code division multiple access is used in second generation mobile radio telephone systems, and is now being proposed for third generation mobile radio telephone systems. A characteristic of a frequency bandwidth in which radio signals are transmitted in second and third generation mobile radio telephone systems is that the radio signals travel between the transmitters and the receivers of the system through a plurality of paths. As a result, data symbols regenerated from the received signals exhibit inter symbol interference that must be cancelled in order for the data to be recovered.

A further advantage of code division multiple access is that radio signals traveling through each of the paths that reach the receiver may be individually resolved and the radio signal energy for each of these signals can be recovered and combined to facilitate detection of the communicated data. A receiver that operates in this way to detect radio signals traveling through individual paths is known as a rake receiver. A rake receiver is provided with a plurality of rake fingers. Each rake finger is configured to correlate the received signals with the user specific spreading code. Each one of the fingers of the rake receiver is assigned to one of a plurality of temporal displacements corresponding to one of a plurality of paths through which the radio signals reach the receiver.

A further known receiver for CDMA spread spectrum radio signals is described in a published article entitled "Blind Adaptive 2D Rake Receiver for DS-CDMA Based on Space-Frequency MVDR Processing," by Zoltowski et al., which is known to have been submitted for publication to the IEEE Journal on Transactions on Signal Processing, June 1996, and is currently available on the Internet. This article discloses a rake receiver operatively associated with an array of antennas that are configured to provide spatial diversity and antenna gain with respect to the detected radio signals. Furthermore, each of the rake fingers operates to correlate the received signals and to form a frequency domain representation of the correlated signals to detect and recover data from the detected radio signals. This rake receiver is referred to in the following description as a two dimensional space-frequency rake receiver.

Mobile radio telecommunications systems are configured to use an allocated portion of the radiofrequency spectrum as efficiently as possible. The ability of a receiver of CDMA radio signals to recover data in the presence of contemporaneously detected radio signals substantially contributes to the efficiency of CDMA communication systems.

SUMMARY OF THE INVENTION

It is accordingly an object of the invention to provide an improved receiver for detecting and recovering data communicated using code division multiple access, and an improved method of detecting and recovering data communicated using code division multiple access, which overcome the above-mentioned disadvantageous of the heretofore known receivers and methods of this type.

With the foregoing and other objects in view there is provided, in accordance with the invention, a receiver for recovering data, for at least one of a plurality of users, from spread spectrum radio signals that include radio signals representative of a combination of data and a data spreading code associated with the at least one of the plurality of users and a combination of a predetermined sequence of pilot data and a pilot spreading code. The improvement includes a plurality of antennas, with each one of the antennas configured to detect a different version of the radio signals. A base band conversion device is electrically coupled to the antennas and configured to generate, for each version of the radio signals, a version of baseband signal samples representative of the respective version of the radio signals. A data recovery device is configured to: correlate each version of the baseband signal samples with respect to the pilot spreading code to obtain respective versions of correlated pilot spreading code signal samples; form at least one covariance matrix from a frequency domain representation of a predetermined temporal window of the respective versions of the correlated pilot spreading code signal samples; correlate each version of the baseband signal samples with respect to the data spreading code to obtain respective versions of correlated data spreading code signal samples; form a frequency domain representation of each version of the correlated data spreading code signal samples; and detect the data from the frequency domain representation of each version of the correlated data spreading code signal samples in combination with the at least one covariance matrix.

With the foregoing and other objects in view there is also provided, in accordance with the invention, a receiver for recovering data, for at least one of a plurality of users, from spread spectrum radio signals that include radio signals representative of a combination of data and a data spreading code associated with the at least one of the plurality of users and a combination of a predetermined sequence of pilot data and a pilot spreading code. The improvement includes a plurality of antennas. Each one of the antennas is configured to detect a different version of the radio signals. A base band conversion device is electrically coupled to the antennas and configured to generate, for each version of the radio signals, a version of baseband signal samples representative of the respective version of the radio signals. A data recovery device includes a plurality of rake detectors. Each one of the rake detectors is electrically coupled to the base band conversion device to obtain a respective version of the base band signal samples. Each one of the rake detectors has: a correlation device to correlate the respective version of the base band signal samples with the data spreading code to obtain correlated data spreading code signal samples and to correlate the respective version of the base band signal samples with the pilot spreading code to obtain correlated pilot spreading code signal samples, and a frequency conversion device electrically coupled to the correlation device to generate a frequency domain representation of the correlated data spreading code signal samples and of the correlated pilot spreading code signal samples. The data recovery device also includes: a combiner device electrically coupled to each one of the rake detectors to form at least one covariance matrix from a frequency domain representation of a predetermined temporal window of the correlated pilot spreading code signal samples obtained from each one of the rake detectors and to combine the covariance matrix with the frequency domain representation of the correlated data spreading code signal samples and of the correlated pilot spreading code signal samples obtained from each one of the rake detectors; and a data detection device to detect data symbols from the combination of the covariance matrix and the frequency domain representations.

In accordance with an added feature of the invention, the covariance matrix formed by the combiner device includes a signal plus interference and noise space-frequency covariance matrix obtained from the frequency domain representation of the predetermined temporal window of the correlated pilot spreading code signal samples obtained from each one of the rake detectors. The temporal window is taken in temporal correspondence with the predetermined sequence of pilot data.

In accordance with an additional feature of the invention, the covariance matrix formed by the combiner device includes an interference and noise-covariance matrix obtained from the predetermined temporal window of the correlated pilot spreading code signal samples obtained from each one of the rake detectors. The temporal window is taken at different temporal displacements. Note that the interference and noise covariance matrix corresponding to one slot can either be estimated by applying the temporal window to the output of the correlator with the pilot sequence in which case the temporal window may not comprise any multipath components. Or the interference and noise covariance matrix can be estimated by applying the temporal window to the signal before it is passed through the correlator.

In accordance with another feature of the invention, the frequency domain representation of the correlated data spreading code signal samples and of the correlated pilot spreading code data signal samples generated by each one of the rake detectors are combined by the combiner device to form a data signal plus interference and noise space-frequency snapshot.

In accordance with a further feature of the invention, the combiner device estimates a weight vector from a matrix selected from the group consisting of a signal space-frequency covariance matrix and a signal plus interference and noise space-frequency co-variance matrix, in combination with an interference and noise-covariance matrix; and multiplies an Hermitian transpose of the weight vector by the data signal plus interference and noise space-frequency snapshot. The data detection device, detects the data symbols from the result of the multiplication.

In accordance with a further added feature of the invention, the predetermined temporal window is taken substantially in accordance with a multiple path delay spread experienced by the radio signals.

In accordance with a further additional feature of the invention, the correlator device includes a first and a second correlator. The first correlator is configured to correlate the respective version of the base band signal samples with the pilot spreading code to obtain the correlated pilot spreading code signal samples. The second correlator can be configured to correlate the respective version of the base band signal samples with the data spreading code to obtain the correlated data spreading code signal samples.

In accordance with yet another feature of the invention, the frequency conversion device is a discrete Fourier transformer or e.g. a Fast transformer.

With the foregoing and other objects in view there is also provided, in accordance with the invention, an apparatus for communicating data with radio signals, including a device for generating spread spectrum radio signals representative of a combination of data and a data spreading code associated with at least one user, and a combination of a predetermined sequence of pilot data and a pilot spreading code. A plurality of antennas is provided, with each one of the plurality of antennas configured to detect a different version of the radio signals. A base band conversion device is coupled to the plurality of antennas and configured to generate, for each antenna, a version of base band signal samples representative of a respective version of the radio signals. A data recovery device is included for: correlating each version of the base band signal samples with respect to the pilot spreading code to obtain correlated pilot spreading code signal samples; forming at least one covariance matrix from a frequency domain representation of a predetermined temporal window of the correlated pilot spreading code signal samples; correlating each version of the base band signal samples with respect to the data spreading code associated with the user to obtain correlated data spreading code signal samples; forming a frequency domain representation of each version of the correlated data spreading code signal samples; and detecting the data from the frequency domain representation of each version of the correlated data spreading code signal samples in combination with the at least one covariance matrix.

With the foregoing and other objects in view there is also provided, in accordance with the invention, a method of recovering data for at least one of a plurality of users from spread spectrum radio signals that include radio signals generated from a combination of the data and a data spreading code associated with the at least one of the plurality of users, and radio signals generated from a combination of a predetermined sequence of pilot data and a pilot spreading code. Spread spectrum radio signals are detected at each one of a plurality of antennas. The spread spectrum radio signals include radio signals generated from a combination of data and a data spreading code associated with a user, and radio signals generated from a combination of a predetermined sequence of pilot data and a pilot spreading code. For each one of the detected spread spectrum radio signals, base band digital signal samples representative of the detected spread spectrum radio signals are generated. For each one of the detected spread spectrum radio signals, the baseband signal samples are correlated with respect to the pilot spreading code to obtain correlated pilot spreading code signal samples. For each one of the detected spread spectrum radio signals, a frequency domain representation of a predetermined temporal window of the correlated pilot spreading code signal samples is formed. At least one covariance matrix using each frequency domain representation of the predetermined temporal window of the correlated pilot spreading code signal samples is formed. For each one of the detected spread spectrum radio signals, the baseband signal samples are correlated with respect to the data spreading code to obtain correlated data spreading code signal samples. For each one of the detected spread spectrum radio signals, a frequency domain representation of the correlated data spreading code signal samples is formed. The data is detected using each frequency domain representation of the correlated data spreading code signal samples in combination with the at least one covariance matrix.

In accordance with an added mode of the invention, for each of the steps of forming a frequency domain representation of a predetermined temporal window of the correlated pilot spreading code signal samples, the predetermined temporal window is taken in temporal correspondence with the predetermined sequence of pilot data. The at least one covariance matrix includes a signal plus interference and noise space-frequency covariance matrix. The signal plus interference and noise space-frequency covariance matrix is formed from each frequency domain representation of the predetermined temporal window of the correlated pilot spreading code signal samples.

In accordance with an additional mode of the invention, for each of the steps of forming a frequency domain representation of a predetermined temporal window of-the correlated pilot spreading code signal samples, the predetermined temporal window is taken at different temporal displacements with respect to a position of the predetermined sequence of pilot data. The at least one covariance matrix includes an interference and noise space-frequency covariance matrix. The interference and noise space-frequency covariance matrix is formed from each frequency domain representation of the predetermined temporal window of the correlated pilot spreading code signal samples.

In accordance with an another mode of the invention, for each of the steps of forming a frequency domain representation of a predetermined temporal window of the correlated pilot spreading code signal samples, the predetermined temporal window is taken at different temporal displacements with respect to a position of the predetermined sequence of pilot data. The at least one covariance matrix includes an interference and noise space-frequency covariance matrix. The interference and noise space-frequency covariance matrix is formed from each frequency domain representation of the predetermined temporal window of the correlated pilot spreading code signal samples.

In accordance with a further mode of the invention, the frequency domain representation of the correlated data spreading code signal samples is combined with the correlated pilot spreading code data signal samples to form a data signal plus interference and noise space-frequency snapshot.

In other words, the frequency domain representation of the correlated data symbols from each antenna are combined to form a data signal plus interference and noise space-frequency snapshot.

In accordance with a further added mode of the invention, a weight vector is estimated from a matrix selected from the group consisting of a signal space-frequency covariance matrix and a signal plus interference and noise space-frequency covariance matrix, in combination with an interference and noise-covariance matrix. A Hermittian transpose of the weight vector is multiplied by the data signal plus interference and noise space-frequency snapshot. The step of detecting the data is performed using the result of the multiplication.

In accordance with a further additional mode of the invention, the predetermined temporal window is taken substantially in accordance with a multiple path delay spread experienced by the radio signals.

With the foregoing and other objects in view there is also provided, in accordance with the invention, a method of communicating data using radio signals that includes generating spread spectrum radio signals representative of a combination of data and a data spreading code associated with a user, and representative of a combination of a predetermined sequence of pilot data and a pilot spreading code. The spread spectrum radio signals are detected at each one of a plurality of antennas. For each one of the detected spread spectrum radio signals, base band digital signal samples representative of the detected spread spectrum radio signals are generated. For each one of the detected spread spectrum radio signals, the baseband signal samples are correlated with respect to the pilot spreading code to obtain correlated pilot spreading code signal samples. For each one of the detected spread spectrum radio signals, a frequency domain representation of a predetermined temporal window of the correlated pilot spreading code signal samples is formed. At least one covariance matrix is formed using each frequency domain representation of the predetermined temporal window of the correlated pilot spreading code signal samples. For each one of the detected spread spectrum radio signals, the baseband signal samples are correlated with respect to the data spreading code to obtain correlated data spreading code signal samples. For each one of the detected spread spectrum radio signals, a frequency domain representation of the correlated data spreading code signal samples is formed. The data is detected using each frequency domain representation of the correlated data spreading code signal samples in combination with the at least one covariance matrix.

In accordance with a concomitant feature of the invention, the receiver operates to effect a two dimensional space-frequency rake receiver, in which space-frequency covariance matrices formed as part of the detection process are established using known data sequences communicated with the data. By exploiting the known pilot data sequences communicated with the user data to estimate the space-frequency covariance matrices, detection and recovery of the data from the spread spectrum radio signals is facilitated. Because radio signals from some users will be received with a considerably higher signal strength than radio signals received from other users, data symbols transmitted by users with strong signals will be more easily detected than symbols from users with relatively weaker radio signals. This is known to those skilled in the art as the near-far problem. The advantages of using a single user symbol detector based on adaptive antennas combined with multi-user interference cancellation in the space frequency domain, as effected by the receiver according to the present invention, is that a reduction in the near-far effect is facilitated.

Furthermore, compared to a two-dimensional space time rake receiver, the two-dimensional space frequency rake receiver is not limited by or to a finite number of rake fingers. As a result of the reduction in the near-far effect, a radio communication system operating with the receiver can be effected with substantially less stringent power control requirements. Furthermore, the receiver is able to detect the data with a substantial reduction in the complexity as compared to a space time rake receiver.

Other features which are considered as characteristic for the invention are set forth in the appended claims.

Although the invention is illustrated and described herein as embodied as a receiver and a method of recovering data from radio signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
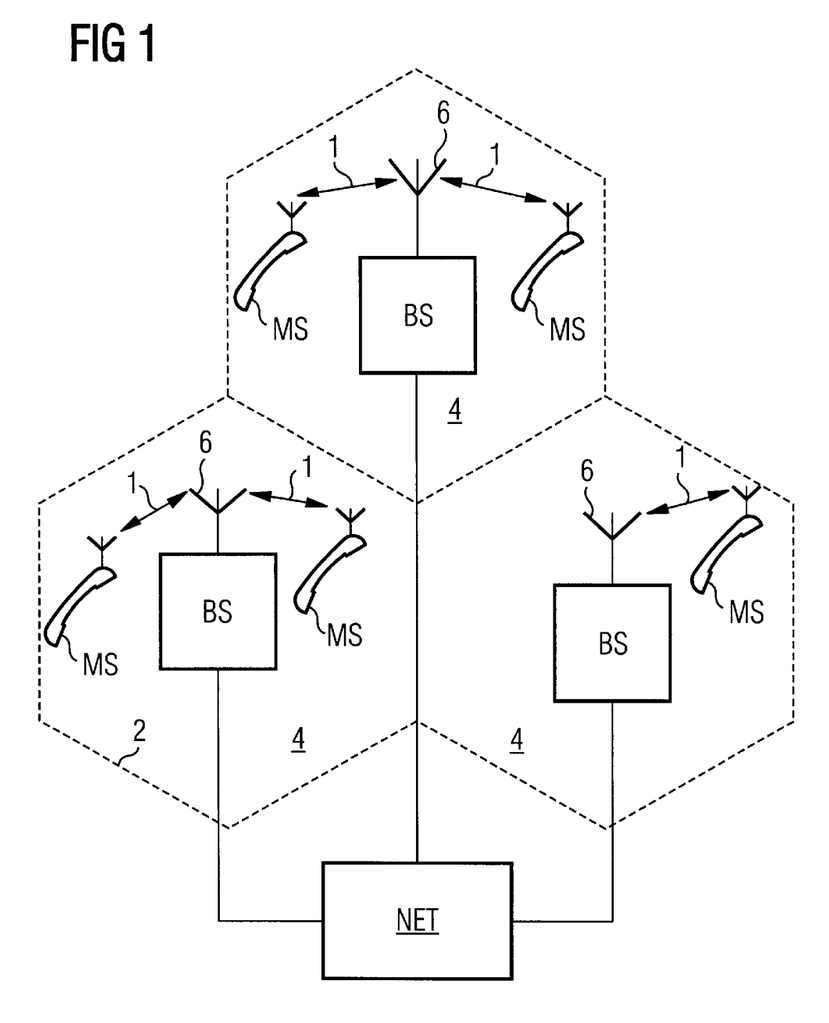
FIG. 1 is a schematic block diagram of a mobile radio telecommunication system.

Referring now to the figures of the drawings in detail and first, particularly to FIG. 1, thereof, there is seen a mobile radio communication system which operates in accordance with code division multiple access (CDMA). A plurality of mobile stations MS communicate using radio signals 1 that are transmitted between the mobile stations MS and a plurality of base stations BS. The base stations are disposed in a spaced apart relationship to provide a radio coverage area that includes a number of cells 2. A cell 2 is defined as a geographical area within which radio communications may be effected with a particular base station BS as opposed to any of the other base stations BS in the mobile radio network. The cells 2 defining the geographical areas for each of the three base stations BS are defined by the dotted lines 4. The mobile stations MS located within a particular cell 2 communicate with the base station BS located within that particular cell 2 using radio signals 1 that are detected by the receive antenna 6 of the base station BS located within that particular cell 2. The base stations BS of the mobile radio network are coupled together through a mobile network infrastructure shown generally as NET.

A characteristic of CDMA radio access techniques is that the mobile stations MS are configured to transmit radio signals contemporaneously to the respective base stations BS, which operate to recover data symbols transmitted by the mobile stations MS by correlating the received radio signals with a user specific spreading code. Data is communicated between the base station BS and mobile stations MS by modulating the data with a user specific spreading code and then modulating the result onto a radio frequency carrier. At the receivers in the respective base and mobile stations, the received radio signals are correlated with the user specific spreading code so that the data symbols are recovered in spite of the presence of contemporaneously detected CDMA signals from other mobile stations. Each of the mobile stations MS may be considered to be a user of the system and the term "user" will be used in the following description to identify signals or data to be communicated from a particular source to a particular sink.

Figure 2:
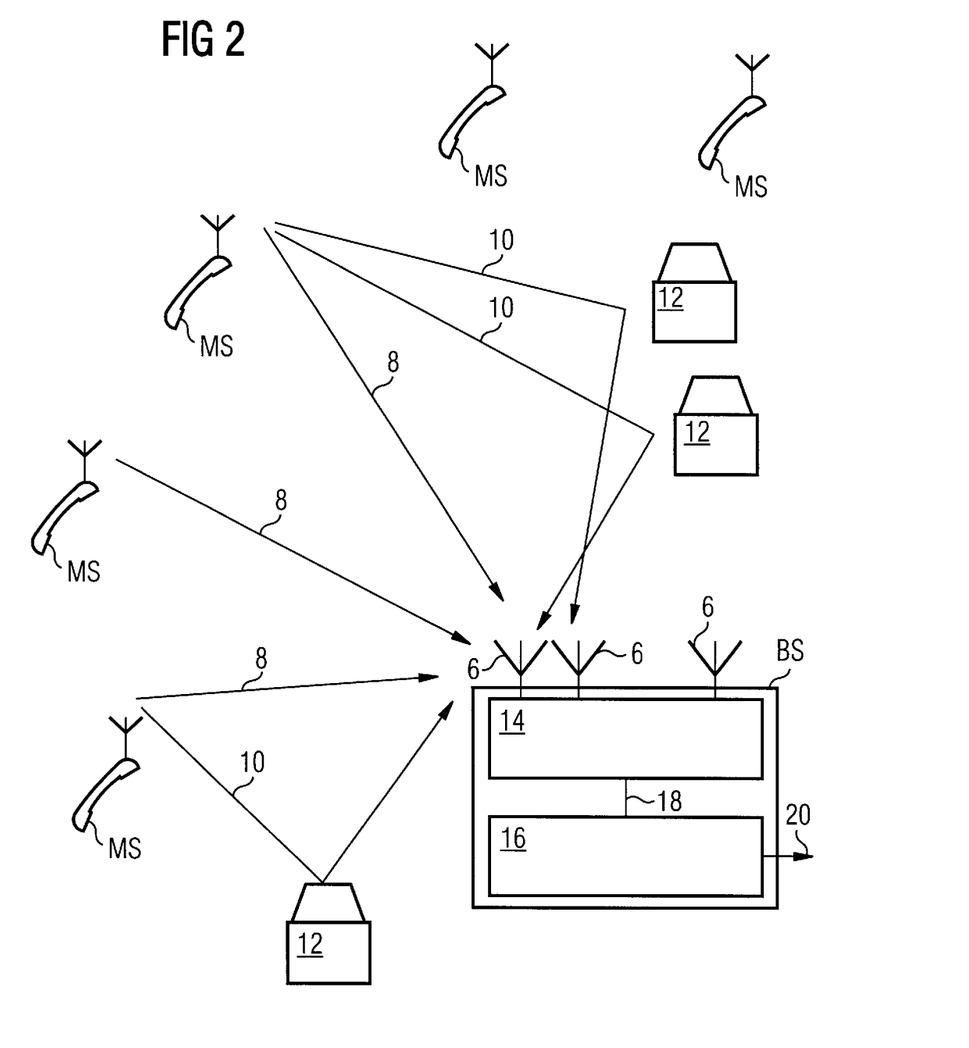
FIG. 2 is a schematic illustration of the propagation of radio signals from the mobile stations shown in FIG. 1 to a one of the base stations shown in FIG. 1.

Referring to FIG. 2, there is seen communication of CDMA signals between the mobile stations MS and one of the base stations BS. Components also shown in FIG. 1 bear identical numerical designations. A plurality of mobile stations MS are shown to communicate radio signals, contemporaneously with the base station BS. A characteristic of the transmission of radio signals within a bandwidth that has been assigned to mobile radio communication systems is that the radio signals reach the receive antenna 6 through a plurality of transmission paths. The lines 8 illustrate direct transmission paths and the lines 10 illustrate indirect transmission paths, which result from the reflection of transmitted radio signals from objects such as buildings 12, for example. Inter symbol interference will occur when the time required for radio signals, traveling through at least two different transmission paths, to reach the base station BS is greater than a symbol period. Therefore, the base station BS must be provided with means to mitigate the effect of multiple path propagation.

The base station BS is provided with a plurality of receive antennas 6 electrically coupled to a down-conversion receiver front end 14. The base station BS detects the received radio signals using the plurality of receive antennas 6, and provides each version of the detected radio signals to the down-conversion receiver front end 14. The receiver 14 provides a down-converted signal for each version of the detected radio signals and then converts the analog down-converted signal versions to digital signal versions, thereby providing base band digital samples. In repetition, the down-converter of the receiver 14 generates base band signal samples for each version of the radio signals detected by the receive antennas 6. The receiver 14 then feeds the base band digital samples to a data recovery means 16 through a conductor 18. The data recovery means 16 operates to recover the data communicated for at least one user and outputs the data on a conductor 20.

Figure 3A:
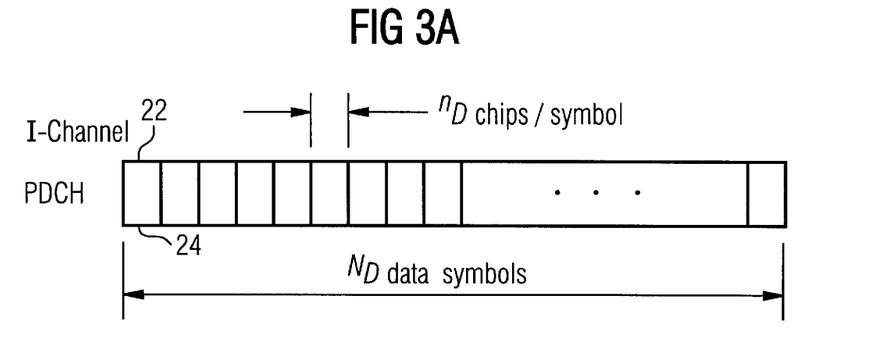
FIGS. 3a and 3b are illustrative diagrams of a radio access frame structure for CDMA signals.
Figure 3B:
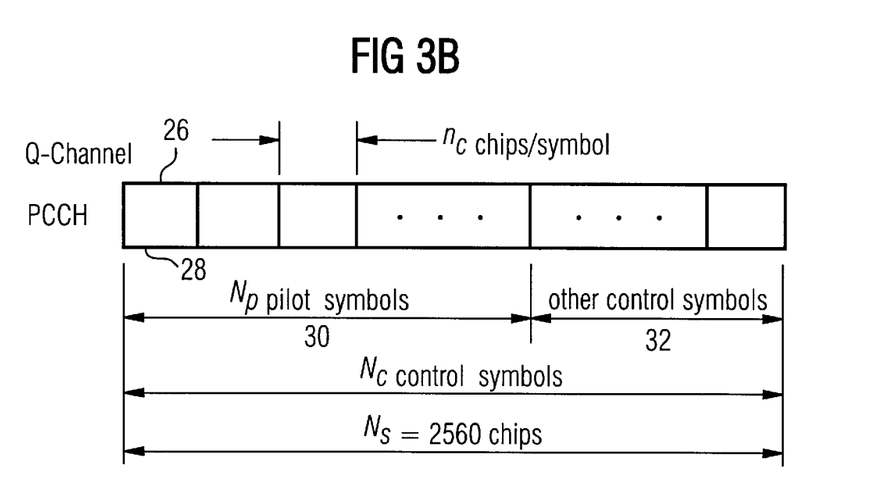

Referring to FIG. 3, it is seen that the CDMA radio access technique is preferably configured with two types of dedicated physical channels. Channels are shown for a radio frequency carrier signal having in-phase (I-channel) and quadrature-phase (Q-channel) signal components. The I- and Q-channel components of the radio frequency carrier are indicated by the reference numerals 22, 24, 26, and 28 with time going from left to right across the figure. The I- and Q-phases of the carrier are divided in time into time slots that are allocated for the transmission of particular types of data. The I-channel is designated as a Physical Data Channel (PDCH), and the carrier frequency is dedicated to the transmission of $N_D$ data symbols spread using a spreading code having $n_D$-chips per symbol. The Q-channel is designated as a Physical Control Channel (PCCH), and the Q-phase carrier is provided with $N_c$ spread control symbols. The $N_c$ spread control symbols include $N_p$ spread symbols that are allocated for transmitting pilot symbols having $n_c$ chips per symbol. The portion of the Physical Control Channel (PCCH) that is allocated for the transmission of pilot symbols is designated by the reference numeral 30, and the portion allocated for the transmission of other types of control symbols is designated by the reference numeral 32.

The CDMA mobile radio system is, therefore, preferably provided with two types of dedicated physical channels that may be on the up-link or the down-link. These channels are the Dedicated Physical Control Channel (PCCH) and the Dedicated Physical Data Channel (PDCH). In case of low or medium data rates, one connection is provided for the PCCH and one for the PDCH.

The PDCH base-band signal of the user of interest may be expressed as given in equation:

$$s_D(t) = \sum_{l=-\infty}^{\infty} b_D^{(l)} w_D(t - lT_D) \quad (1)$$

Where in equation (1), $$w_D(t) = \sum_{m=1}^{n_D} d_m p(t - mT_C).$$

An example chip rate is 1/T 4.096 Mchips/s. Moreover, the spreading sequence of the PDCH, $w_D(t)$, is of length $T_D = n_D T_c$ and is composed of $n_D$ chips $d_m \in \{-1,1\}$, $1 \leq m \leq nD$. The symbols, $b_D^{(l)} \in \{-1,1\}$ are BPSK modulated. The example CDMA system uses a chip wave form, $p(t) \in R$ characterized by a square-root raised cosine spectrum with a roll-off factor of $\alpha=0.22$. The PCCH base band signal $s_c(t)$ can be expressed in the same way. In the example embodiment, a combination of code and I and Q multiplexing is used to convey the data and pilot symbols as illustrated in FIG. 3. The PDCH and PCCH are spread by different spreading codes and mapped on to the I and Q branches respectively, according to equation (2):

$$s(t)=s_D(t)+js_c(t) \quad (2)$$

Figure 4:
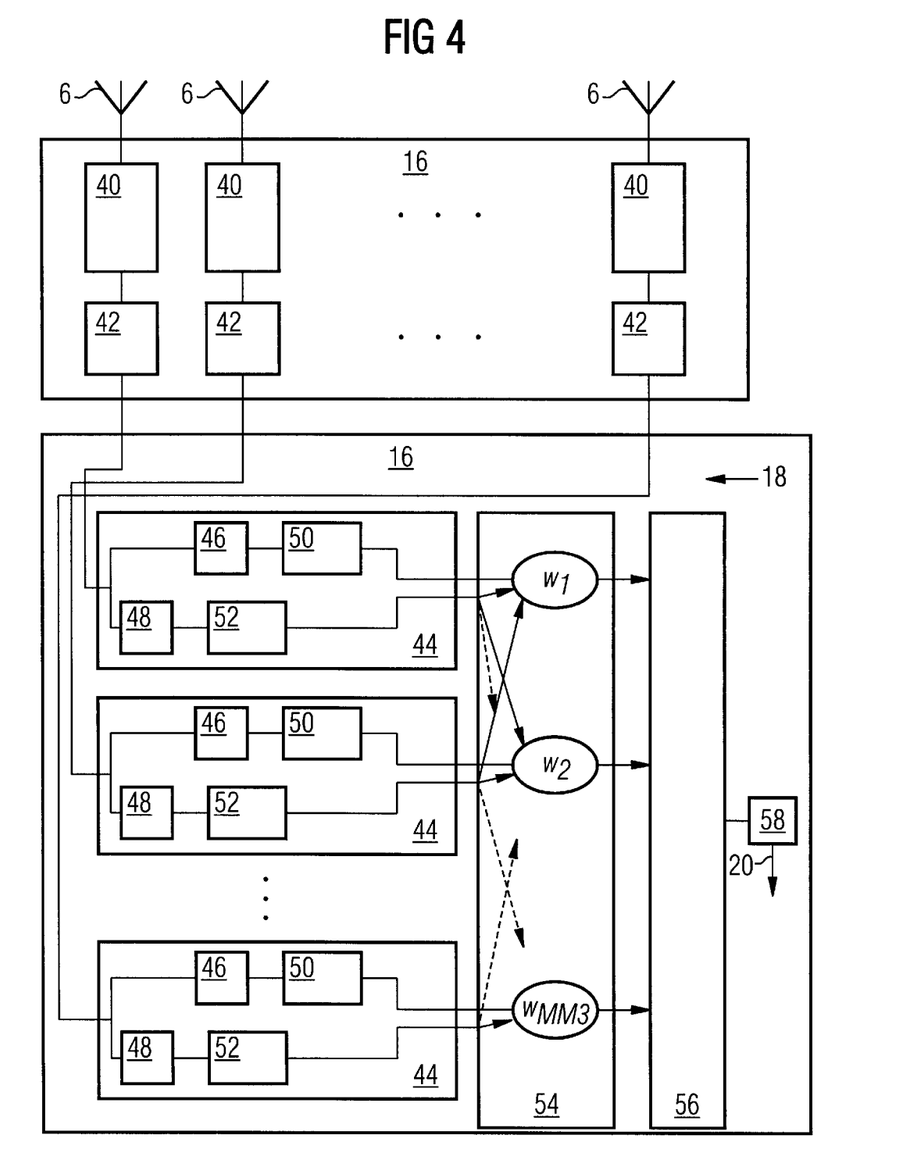
FIG. 4 is a schematic block diagram of a receiver embodied in one of the base stations shown in FIGS. 1 and 2.

Referring to FIG. 4, the receiver embodied within the base station BS is shown. Components also shown in FIGS. 1, 2 and 3 are identified by the same alpha-numeric characters. Each one of the plurality of receive antennas 6 are connected to a corresponding one of the plurality of base band demodulators 40. The output of each base band demodulator 40 is coupled to an analog to digital converter 42, which operates to generate digital samples representative of the base band version of the radio signals provided by the respective base band demodulator 40. Although there are only three receive antennas 6 shown in FIG. 4, any number of receive antennas 6 could be used which would be coupled to a corresponding base band demodulator 40 and analog to digital converter 42. Each of the analog to digital converters 42 feeds over sampled signals on conductors 18 to a corresponding rake finger 44 forming part of the data recovery means 16. The rake fingers 44 form part of a two-dimensional-space frequency rake receiver. Each of the rake fingers 44 is provided with a first 46 and a second 48 correlator configured to receive the over sampled signals in parallel. For each of the first 46 and second 48 correlators, there is provided a respective discrete fourier transformer 50, 52. Each of the outputs of the discrete fourier transformers 50, 52, are provided to a weighting factor generator 54. The weighting factor generator 54 is coupled to a combiner 56 through a plurality of conductors corresponding to each of the weighting factors $w_i$ generated by the weighting factor generator 54. The output of the combiner 56 is provided to a symbol decision maker 58 that determines the data symbol for the corresponding user, and outputs the data symbol on the conductor 20.

Referring to FIG. 4, the operation of the receiver will be described in the following paragraphs. However, a full description of a two-dimensional space-frequency rake receiver will not be given, as this is provided in the above referenced published article entitled "Blind Adaptive 2D Rake Receiver for DS-CDMA Based on Space-Frequency MVDR Processing," by Zoltowski et al., that was submitted for publication to the IEEE Journal on Transactions on Signal Processing, June 1996, and is currently available on the Internet, which is herein fully incorporated by reference.

The structure of the two-dimensional space-frequency rake receiver shown in FIG. 4, differs from the known two-dimensional space-frequency rake in that the space-frequency covariance matrices $R_{S+I+N}$ and $R_{I+N}$ are generated from the pilot symbols 30 transmitted at the beginning of the PCCH time slot. Each of the rake fingers 44 recovers a symbol estimate for a plurality of $M_3$ frequency bins. The first correlator 46 within each of the rake fingers 44 is configured to correlate the received signals with respect to the pilot spreading code. The second correlator 48 is configured to cross-correlate the received signals with the user data spreading code provided for the data channel.

The receiver shown in FIG. 4 uses the pilot symbols at the beginning of the PCCH slot to generate the space-frequency covariance matrices $R_{S+I+N}$ and $R_{I+N}$. The space-frequency covariance matrices $R_{S+I+N}$ and $R_{I-N}$ are used to obtain a "largest" generalized eigenvector which is the optimum (space frequency) weight vector w. The optimum weight vector w is then applied to the data symbols detected from the PDCH to recover the data symbols.

Single-user symbol detection in CDMA systems must take multi-user interference into account to achieve a significant increase in performance. By estimating the interference and noise space-frequency covariance matrix $R_{I+N}$ in addition to the signal space-frequency covariance matrix $R_S$ or the signal and interference plus noise space-frequency covariance matrix $R_{S+I+N}$, the signal to interference and noise ratio (SINR) can be maximized according to equation (3):

$$SINR = \max_w \frac{w^H R_S w}{w^H R_{I+N} w} \quad (3)$$
$$= \max_w \frac{w^H R_{S+I+N} w}{w^H R_{I+N} w} - 1$$

The optimum weight vector w, which is the largest generalized eigenvector of the $MM_3 \times MM_3$ matrix pencil $\{R_S, R_{I+N}\}$, is applied to space-frequency 'snapshots' of the PDCH corresponding to the data symbols obtained for each rake finger 44. The number of frequency bins and the number of antenna elements are denoted by $M_3$ and M, respectively. If the estimation takes place in the space-frequency domain instead of the space-time domain, frequency bins with low power can be omitted, thus reducing the computational complexity of (3).

The space-frequency covariance matrices and, therefore, the optimum weight vector w are estimated from the PCCH. At the beginning of each PCCH slot 30, $N_p$ pilot symbols are broadcast. The receiver is assumed to be synchronized to the beginning of a slot. The over-sampled output of each antenna element that is passed through the first correlator 46, can be described by equation (4):

$$c_c(nT_I)=\Sigma_{l=0}^{N_p-1} b_c^{(l)} w_c(nT_I - lT_C) \in C^N p^{nCMc} \quad (4)$$

where $T_C$ is the chip duration, $N_S$ is the number of chips within the correlation window and $M_c$ is the number of samples per chip. Defining a matrix $\aleph_{corcor} \in C^{M \times (N_S M_C)}$ containing $N_s M_c$ samples of the output of the corresponding antenna element after the first correlator, a selection matrix is formed, as expressed by equation (5):

$$J^{(i)} = \begin{bmatrix} 0_{(i-1) \times N_w} \\ I_{N_w \times N_w} \\ 0_{(N_S M_C - i - N_w + 1) \times N_w} \end{bmatrix} \qquad (5)$$

where the maximum propagation delay in samples is denoted by $$N_w = M_c \frac{\tau_{max}}{T_C}.$$

If i=1 holds, $\aleph_{corcor} J^{(l)} \in C^{M \times N_w}$ corresponds to the multipath delay spread. The output for $i=N_w, N_{w+1}, \ldots, N_S M_C - N_w$ is used to estimate the interference and noise covariance matrix. The ith space-frequency snapshot provided by respective rake fingers is defined by equation (6):

$$y^{(l)} = vec\{\aleph_{corcor} J^{(l)} W \qquad (6)$$

Here, vec{A denotes a vector-valued function that maps an m×n matrix A into an mn-dimensional column vector by stacking the columns of the matrix.

It is well known that each column of the $N_w$-point DFT matrix W is of the form expressed in equation (7):

$$w_l = [1 \; e^{-jlw_0} \; e^{-j2lw_0} \; e^{-j(N_w-1)lw_0}]^T \qquad (7)$$

Here, the columns of W compute $M_3 \leq N_w$ frequency bins centred at DC according to equation (8):

$$W = [w_{N_w - (M_3-1)/2} \cdots w_0 \cdots w_{(M_3-1)/2}] \qquad (8)$$

where the wrap-around property of the DFT matrix has been utilized. The channel is assumed to stay constant for the duration of one slot. Therefore, the signal plus interference and noise space-frequency covariance matrix is estimated based only on one space-frequency 'snapshot', and is expressed by equation (9):

$$\hat{R}_{S+I+N} = y^{(l)} \cdot y^{(l)H} \qquad (9)$$

Notice that $\aleph_{corcor} J^{(l)}$ comprises the multipath delay spread of the correlator output for the user of interest, as illustrated in FIG. 4. The interference plus noise space-frequency covariance matrix is estimated by equation (10):

$$\hat{R}_{I+N} = \frac{1}{N_S M_c - 2N_w + 1} \sum_{i=N_w}^{N_S M_C - N_w} y^{(i)} \cdot y^{(i)H} \qquad (10)$$

The known two-dimensional space-frequency rake receiver as disclosed in the article by Zoltowski et al., utilizes a blind estimate of the covariance matrices, whereas with the example embodiment of the invention, shown in FIG. 4, the estimate of the space-frequency covariance matrices are not blind. This is because the pilot symbols at the beginning of each PCCH slot are exploited to estimate the space-frequency covariance matrices. Moreover, the obtained weight vector w is estimated in the PCCH and applied to the PDCH for symbol detection.

We assume that the receiver is synchronized to the beginning of the lth bit in the PDCH slot. The over-sampled output of a particular antenna element 6 is passed through the corresponding second correlator 48 of the corresponding rake finger 44. This process is performed for the signal obtained from each antenna element 6 so that the second correlator 48 of each rake finger 44 receives an over-sampled output from a corresponding antenna element 6. This is expressed by equation (11):

$$c_D(nT_l) = w_D(nT_l - lT_D) \in C^{nDMc} \qquad (11)$$

A matrix $\aleph_D^{(l)} \in C^{M \times N_w}$ is defined in which each row contains $N_w$ signal samples of the signal from the corresponding antenna element 6 after being processed by the corresponding correlator 48. The space-frequency 'snapshot' corresponding to the lth communicated data bit from the PDCH time slot is obtained according to (6), as expressed in equation (12):

$$y_D^{(l)} = vec\{\aleph_D^{(l)} J^{(l)} W \qquad (12)$$

The optimum decision statistic may then be expressed as $\hat{b}^l = w^H \cdot y_D^{(l)}$, as disclosed in the above referenced published article by Zoltowski et al., where w is the optimum weight vector defined in equation (3).

Figure 5:
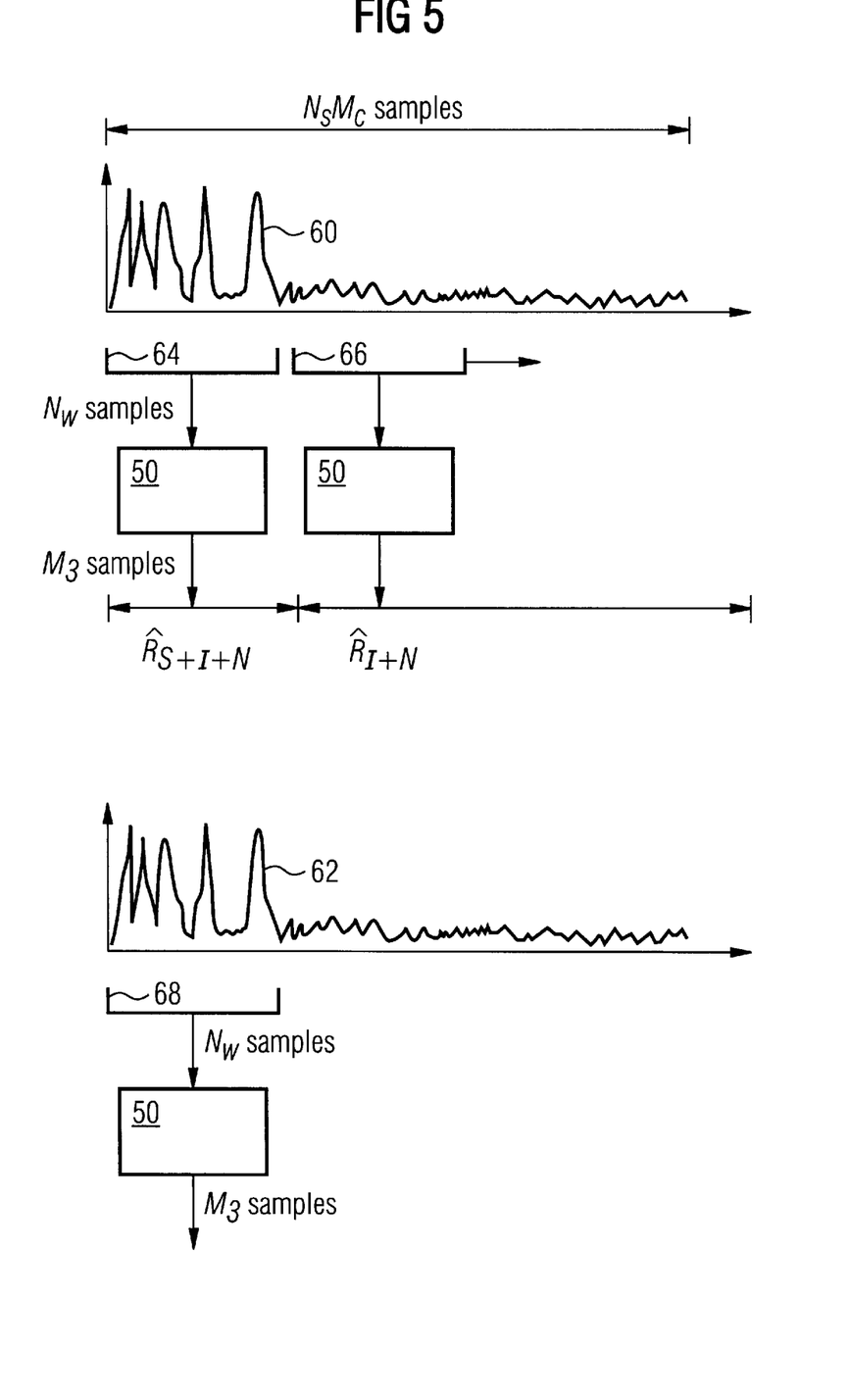
FIG. 5 is an illustrative representation of the operation of the receiver shown in FIG. 4.

Referring to FIG. 5, the operation of the receiver shown in FIG. 4 can be seen. Components also appearing in FIG. 4 have been identified by the same reference numerals. The signal samples generated at the output of the first and second correlators 46, 48 are represented as continuous lines 60, 62, rather than discrete samples. The samples are plotted with the vertical axis representing the amplitude and the horizontal axis representing the time. The time slot within which the signal samples are generated is shown to include $N_S M_C$ signal samples. The first plot 60 represents the result of cross correlating the control channel spreading code with the received signals. At the start of the time slot, a window 64 of $N_w$ samples are fed to the discrete fourier transformer 50 which forms the co-variance matrix $R_{S+I+N}$. A sliding correlation window 66 is applied to the rest of the samples, and these samples are also fed to the discrete fourier transformer 50 to generate the co-variance matrix $R_{I+N}$. Correspondingly, for the data channel, a correlation window 68 having $N_w$ signal samples at the start of the burst are fed to the second discrete fourier transformer 52, to form the decision vector according to equation (12).

A step by step description of the operation of the data detector shown in FIG. 4, is presented in the following paragraphs:

Step 1: Base Band Demodulation

The signals are received at the elements of the adaptive antenna array and are demodulated down to base band.

Step 2: Sampling

Using an analog to digital-converter (ADC), the analog signals are over sampled.

Step 3: Correlation

A moving window is applied to the ADC outputs and is correlated with the pilot sequence that is positioned at the beginning of each PCCH slot and that is adapted for scrambling. We assume that the first window of the ADC utputs is synchronized with the beginning of the PCCH slot.

The size of the window matches the multiple path delay spread.

The samples of all PCCH correlator outputs that belong to the first window are used to generate the signal plus interference and noise space frequency covariance matrices. The following samples from the PCCH correlator are used to generate the interference and noise space-frequency covariance matrix.

Step 4: Generation of the Signal Plus Interference and Noise Space Frequency Covariance Matrix The samples comprising the multiple-path delay spread (first window) are transformed into the space-frequency domain by a discrete Fourier transformation (DFT). The obtained signal plus interference and noise space-frequency snapshot is used to determine the signal plus interference and noise space frequency covariance matrix according to equation (9).

Step 5: Generation of the Interference and Noise Space Frequency Covariance Matrix The signal plus interference and noise space frequency covariance matrix is generated by averaging over the space-frequency snapshots generated by a sliding correlator (sliding window) and a DFT transformation according to equation (10).

Step 6: Estimation of the Optimum Weight Vector

The optimum weight vector is the largest generalized eigenvector of the matrix pencil defined by the signal space frequency covariance matrix and the interference and noise-covariance matrix according to equation (3). With a minor change in equation (3), the signal plus interference and noise space frequency covariance matrices are used instead of the signal space frequency covariance matrix.

Step 7: Obtaining the Decision Variables of the Data Symbols

We assume that the output of the PDCH correlator is synchronized with the beginning of a symbol. A signal plus interference and noise space-frequency snapshot is obtained that corresponds to the symbol of interest in the same way that the signal plus interference and noise space-frequency snapshot was obtained for the PCCH in step 4. According to the equation $\hat{b}^{(l)}=w^{H}\cdot y_D^{(l)}$, the decision variable is obtained by multiplying the Hermitian of the optimal weight vector with the signal plus interference and noise space frequency snapshot of the data symbol of interest.

Note that the control symbols that are not pilot symbols are obtained in the same way in the PCCH.

Step 8: This Procedure is Repeated for Each Slot

It will now be apparent that other ways of combining the outputs of each of the discrete fourier transformers can be envisaged in order to effect recovery of the data symbols. Furthermore, other configurations of modulating or combining the data with the spreading codes may be effected in accordance with a wide or narrow band code division multiple access technique.

We claim:

1. In a receiver for recovering data, for at least one of a plurality of users, from spread spectrum radio signals that include radio signals representative of a combination of data and a data spreading code associated with the at least one of the plurality of users and a combination of a predetermined sequence of pilot data and a pilot spreading code, the improvement comprising:

a plurality of antennas, each one of said antennas configured to detect a different version of the radio signals;

a base band conversion device electrically coupled to said antennas and configured to generate, for each version of the radio signals, a version of baseband signal samples representative of the respective version of the radio signals; and a data recovery device configured to:

correlate each version of the baseband signal samples with respect to the pilot spreading code to obtain respective versions of correlated pilot spreading code signal samples;

form at least one covariance matrix from a frequency domain representation of a predetermined temporal window of the respective versions of the correlated pilot spreading code signal samples;

correlate each version of the baseband signal samples with respect to the data spreading code to obtain respective versions of correlated data spreading code signal samples;

form a frequency domain representation of each version of the correlated data spreading code signal samples; and detect the data from the frequency domain representation of each version of the correlated data spreading code signal samples in combination with the at least one covariance matrix.

2. In a receiver for recovering data, for at least one of a plurality of users, from spread spectrum radio signals that include radio signals representative of a combination of data and a data spreading code associated with the at least one of the plurality of users and a combination of a predetermined sequence of pilot data and a pilot spreading code, the improvement comprising:

a plurality of antennas, each one of said antennas configured to detect a different version of the radio signals;

a base band conversion device electrically coupled to said antennas and configured to generate, for each version of the radio signals, a version of baseband signal samples representative of the respective version of the radio signals; and a data recovery device including:

a plurality of rake detectors, each one of said rake detectors electrically coupled to said base band conversion device to obtain a respective version of the base band signal samples, each one of said rake detectors having:

a correlation device to correlate the respective version of the base band signal samples with the data spreading code to obtain correlated data spreading code signal samples and to correlate the respective version of the base band signal samples with the pilot spreading code to obtain correlated pilot spreading code signal samples, and a frequency conversion device electrically coupled to said correlation device to generate a frequency domain representation of the correlated data spreading code signal samples and of the correlated pilot spreading code signal samples;

a combiner device electrically coupled to each one of said rake detectors to form at least one covariance matrix from a frequency domain representation of a predetermined temporal window of the correlated pilot spreading code signal samples obtained from each one of said rake detectors and to combine the covariance matrix with the frequency domain representation of the correlated data spreading code signal samples and of the correlated pilot spreading code signal samples obtained from each one of said rake detectors; and a data detection device to detect data symbols from the combination of the covariance matrix and the frequency domain representations.

3. The receiver according to claim 2, wherein the at least one covariance matrix formed by said combiner device includes a signal plus interference and noise space-frequency covariance matrix obtained from the frequency domain representation of the predetermined temporal window of the correlated pilot spreading code signal samples obtained from each one of said rake detectors, the temporal window taken in temporal correspondence with the predetermined sequence of pilot data.

4. The receiver according to claim 2, wherein the at least one covariance matrix formed by said combiner device includes an interference and noise-covariance matrix obtained from the predetermined temporal window of the correlated pilot spreading code signal samples obtained from each one of said rake detectors, the temporal window taken at different temporal displacements with respect to the transmission of the predetermined sequence of pilot data.

5. The receiver according to claim 2, wherein the frequency domain representation of the correlated data spreading code signal samples and of the correlated pilot spreading code data signal samples generated by each one of said rake detectors are combined by said combiner device to form a data signal plus interference and noise space-frequency snapshot.

6. The receiver according to claim 5, wherein:
the combiner device estimates a weight vector from a matrix selected from the group consisting of a signal space-frequency covariance matrix and a signal plus interference and noise space-frequency co-variance matrix, in combination with an interference and noise-covariance matrix; and
multiplies a Hermitian transpose of the weight vector by the data signal plus interference and noise space-frequency snapshot; and
said data detection device, detects the data symbols from the result of the multiplication.

7. The receiver according to claim 2, wherein the predetermined temporal window is taken substantially in accordance with a multiple path delay spread experienced by the radio signals.

8. The receiver according to claim 2, wherein said correlator device includes a first and a second correlator, said first correlator configured to correlate the respective version of the base band signal samples with the pilot spreading code to obtain the correlated pilot spreading code signal samples, and said second correlator configured to correlate the respective version of the base band signal samples with the data spreading code to obtain the correlated data spreading code signal samples.

9. The receiver according to claim 2, wherein said frequency conversion device is a discrete fourier transformer.

10. An apparatus for communicating data with radio signals, comprising:
means for generating spread spectrum radio signals representative of a combination of data and a data spreading code associated with at least one user, and a combination of a predetermined sequence of pilot data and a pilot spreading code;
a plurality of antennas, each one of said plurality of antennas configured to detect a different version of the radio signals;
base band conversion means coupled to said plurality of antennas and configured to generate, for each antenna, a version of base band signal samples representative of a respective version of the radio signals; and
data recovery means for:
correlating each version of the base band signal samples with respect to the pilot spreading code to obtain correlated pilot spreading code signal samples;
forming at least one covariance matrix from a frequency domain representation of a predetermined temporal window of the correlated pilot spreading code signal samples;
correlating each version of the base band signal samples with respect to the data spreading code associated with the user to obtain correlated data spreading code signal samples;
forming a frequency domain representation of each version of the correlated data spreading code signal samples; and
detecting the data from the frequency domain representation of each version of the correlated data spreading code signal samples in combination with the at least one covariance matrix.

11. A method of recovering data for at least one of a plurality of users from spread spectrum radio signals that include radio signals generated from a combination of the data and a data spreading code associated with the at least one of the plurality of users, and radio signals generated from a combination of a predetermined sequence of pilot data and a pilot spreading code, the method which comprises:
detecting spread spectrum radio signals at each one of a plurality of antennas, the spread spectrum radio signals including radio signals generated from a combination of data and a data spreading code associated with a user, and radio signals generated from a combination of a predetermined sequence of pilot data and a pilot spreading code;
for each one of the detected spread spectrum radio signals, generating base band digital signal samples representative of the detected spread spectrum radio signals;
for each one of the detected spread spectrum radio signals, correlating the baseband signal samples with respect to the pilot spreading code to obtain correlated pilot spreading code signal samples;
for each one of the detected spread spectrum radio signals, forming a frequency domain representation of a predetermined temporal window of the correlated pilot spreading code signal samples;
forming at least one covariance matrix using each frequency domain representation of the predetermined temporal window of the correlated pilot spreading code signal samples;
for each one of the detected spread spectrum radio signals, correlating the baseband signal samples with respect to the data spreading code to obtain correlated data spreading code signal samples;
for each one of the detected spread spectrum radio signals, forming a frequency domain representation of the correlated data spreading code signal samples; and
detecting the data using each frequency domain representation of the correlated data spreading code signal samples in combination with the at least one covariance matrix.

12. The method according to claim 11, which comprises:
for each of the steps of forming a frequency domain representation of a predetermined temporal window of the correlated pilot spreading code signal samples, taking the predetermined temporal window in temporal correspondence with the predetermined sequence of pilot data;
defining the at least one covariance matrix to include a signal plus interference and noise space-frequency covariance matrix; and
forming the signal plus interference and noise space-frequency covariance matrix from each frequency domain representation of the predetermined temporal window of the correlated pilot spreading code signal samples.

13. The method according to claim 12, which comprises:

for each of the steps of forming a frequency domain representation of a predetermined temporal window of the correlated pilot spreading code signal samples, taking the predetermined temporal window at different temporal displacements with respect to a position of the predetermined sequence of pilot data;

defining the at least one covariance matrix to include an interference and noise space-frequency covariance matrix; and forming the interference and noise space-frequency covariance matrix from each frequency domain representation of the predetermined temporal window of the correlated pilot spreading code signal samples.

14. The method according to claim 11, which comprises:

for each of the steps of forming a frequency domain representation of a predetermined temporal window of the correlated pilot spreading code signal samples, taking the predetermined temporal window at different temporal displacements with respect to a position of the predetermined sequence of pilot data;

defining the at least one covariance matrix to include an interference and noise space-frequency covariance matrix; and forming the interference and noise space-frequency covariance matrix from each frequency domain representation of the predetermined temporal window of the correlated pilot spreading code signal samples.

15. The method according to claim 11, which comprises:

combining the frequency domain representation of the correlated data spreading code signal samples and of the correlated pilot spreading code data signal samples to form a data signal plus interference and noise space-frequency snapshot.

16. The method according to claim 15, which comprises:

estimating a weight vector from a matrix selected from the group consisting of a signal space-frequency covariance matrix and a signal plus interference and noise space-frequency co-variance matrix, in combination with an interference and noise-covariance matrix;

multiplying a Hermitian transpose of the weight vector by the data signal plus interference and noise space-frequency snapshot; and performing the step of detecting the data using the result of the multiplication.

17. The method according to claim 11, wherein the predetermined temporal window is taken substantially in accordance with a multiple path delay spread experienced by the radio signals.

18. A method of communicating data using radio signals, which comprises:

generating spread spectrum radio signals representative of a combination of data and a data spreading code associated with a user, and representative of a combination of a predetermined sequence of pilot data and a pilot spreading code;

detecting the spread spectrum radio signals at each one of a plurality of antennas;

for each one of the detected spread spectrum radio signals, generating base band digital signal samples representative of the detected spread spectrum radio signals;

for each one of the detected spread spectrum radio signals, correlating the baseband signal samples with respect to the pilot spreading code to obtain correlated pilot spreading code signal samples;

for each one of the detected spread spectrum radio signals, forming a frequency domain representation of a predetermined temporal window of the correlated pilot spreading code signal samples;

forming at least one covariance matrix using each frequency domain representation of the predetermined temporal window of the correlated pilot spreading code signal samples;

for each one of the detected spread spectrum radio signals, correlating the baseband signal samples with respect to the data spreading code to obtain correlated data spreading code signal samples;

for each one of the detected spread spectrum radio signals, forming a frequency domain representation of the correlated data spreading code signal samples; and detecting the data using each frequency domain representation of the correlated data spreading code signal samples in combination with the at least one covariance matrix.

\* \* \* \* \*